United States Patent
Horvat et al.

(10) Patent No.: US 12,407,044 B1
(45) Date of Patent: Sep. 2, 2025

(54) ZEOLITE BATTERY HEATER

(71) Applicants: Hillary Horvat, Tryon, NC (US); Gary L Horvat, Rochester Hills, MI (US)

(72) Inventors: Hillary Horvat, Tryon, NC (US); Gary L Horvat, Rochester Hills, MI (US)

( * ) Notice: Subject to any disclaimer, the term of this patent is extended or adjusted under 35 U.S.C. 154(b) by 0 days.

(21) Appl. No.: 18/771,951

(22) Filed: Jul. 12, 2024

(51) Int. Cl.
*H01M 10/6595* (2014.01)
*H01M 10/615* (2014.01)
*H01M 10/625* (2014.01)
*H01M 10/6551* (2014.01)

(52) U.S. Cl.
CPC ... *H01M 10/6595* (2015.04); *H01M 10/6551* (2015.04); *H01M 10/615* (2015.04); *H01M 10/625* (2015.04)

(58) Field of Classification Search
CPC ......... H01M 10/6595; H01M 10/6551; H01M 10/615; H01M 10/625
See application file for complete search history.

(56) References Cited

U.S. PATENT DOCUMENTS

| | | | |
|---|---|---|---|
| 10,112,502 | B2 | 10/2018 | Buckhout |
| 2010/0101613 | A1 | 4/2010 | Jerg et al. |
| 2013/0192281 | A1 | 8/2013 | Nam et al. |
| 2015/0345839 | A1 | 12/2015 | Wang et al. |
| 2021/0098842 | A1 | 4/2021 | Nowak et al. |

FOREIGN PATENT DOCUMENTS

SG 10201806044 8/2018

OTHER PUBLICATIONS

Prospective life cycle assessment for designing mobile thermal energy storage system utilizing zeolite, Journal of Cleaner Production vol. 365, Sep. 10, 2022 (Fujii) (Year: 2022).*
Fraunhofer Institute for Interfacial Engineering and Biotechnology IGB, "Compact and Flexible Thermal Storage", Fraunhofer Research News (Jun. 2012).

* cited by examiner

*Primary Examiner* — Ula C Ruddock
*Assistant Examiner* — Sarika Gupta

(57) ABSTRACT

The invention utilizes the heat storage capabilities of the mineral family of zeolites. Zeolite media is stored in a container. There is a place to add water to the zeolite in the container that will then release heat. The zeolite media releases its heat and heats a coil that is within the container and extends outside the container to heat a battery or a surrounding area. When the heat stored in the zeolite is exhausted it is recharged by using the heat coil in reverse to heat the zeolite and evaporate the water. The steam leaves the container through a one-way steam valve. Once the water is evaporated the zeolite is recharged with heat and ready for another use. This invention has a simple functionality store heat in zeolite, add water to release heat from zeolite, reheat the zeolite when evaporating the water. The invention contains the infrastructure required.

1 Claim, 1 Drawing Sheet

Drawing Reference Numbers Figure 1

1. Water Inlet to add water
2. One way steam valve
3. Zeolite Heating Media
4. Heating Element
5. Battery Pack
6. Battery Module
7. Container

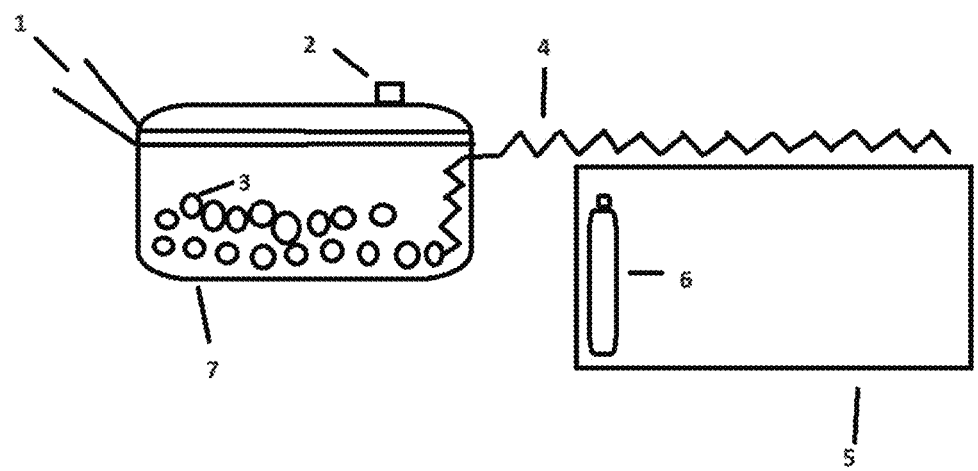
Drawing Reference Numbers Figure 1
1. Water Inlet to add water
2. One way steam valve
3. Zeolite Heating Media
4. Heating Element
5. Battery Pack
6. Battery Module
7. Container

ZEOLITE BATTERY HEATER

BACKGROUND OF THE INVENTION

Batteries perform worse in cold temperatures primarily due to the impact on the chemical reactions that generate electrical energy within them. The main reasons for worse performance are:

Slower Chemical Reactions—Batteries work by chemical reactions that release electrons to create a current. Cold temperatures slow down these reactions, reducing the battery's ability to generate power.

Increased Internal Resistance—The internal resistance of a battery increases in cold temperatures. Higher resistance means the battery has to work harder to provide the same amount of power, leading to reduced efficiency and performance.

Electrolyte Viscosity—The electrolyte in batteries becomes more viscous at lower temperatures. This increased viscosity can hinder the movement of ions between the electrodes, further slowing the chemical reactions and reducing the battery's overall performance Reduced Ion Mobility—Cold temperatures decrease the mobility of ions within the battery. Since the movement of ions is crucial for the battery's operation, reduced ion mobility leads to a decrease in the battery's ability to deliver current.

Potential for Reduced Capacity—The overall capacity of a battery can be temporarily reduced in cold conditions. This means that even if the battery is fully charged, it might not be able to store or deliver as much energy as it would at a warmer temperature.

Physical Effects—In extreme cold, the materials that make up the battery (such as the separator, anode, and cathode) can contract and potentially cause structural issues, further impairing performance Electric vehicle (EV) batteries are crucial components that require careful management of temperature to ensure optimal performance, longevity, and safety. Several heating methods are currently employed to maintain battery temperature in electric vehicles, especially in cold climates or during fast charging. Here are some common approaches:

Battery Heating Systems: Many electric vehicles are equipped with built-in battery heating systems. These systems use resistive heating elements embedded within the battery pack or placed in proximity to it. These elements generate heat when an electric current passes through them. They are typically controlled by the vehicle's battery management system (BMS) to regulate the temperature within the desired range. The main battery provides the energy to these heating elements which reduces the range of the electric vehicle.

Thermal Management Systems: Advanced electric vehicles often feature sophisticated thermal management systems that include both heating and cooling capabilities. These systems use a combination of liquid or air-based cooling/heating loops to regulate the temperature of the battery pack. They may employ heat exchangers, pumps, and fans to transfer heat away from or into the battery pack as needed.

Preconditioning: Some EVs offer pre-conditioning features that allow drivers to warm up the battery pack before starting a journey. This can currently be done while the vehicle is plugged in, using electricity from the grid, or a combustible fuel source to heat the battery to an optimal temperature range for improved efficiency and performance.

Passive Thermal Management: In addition to active heating systems, electric vehicles may also incorporate passive thermal management techniques. These include insulation materials to retain heat within the battery pack and reduce heat loss to the surroundings. Passive thermal management helps maintain stable battery temperatures during operation.

Regenerative Braking: Regenerative braking systems, which capture kinetic energy during deceleration and convert it into electrical energy to recharge the battery, can also generate heat. In some cases, this heat can be directed back into the battery pack to help maintain its temperature.

External Charging Infrastructure: Rapid charging stations, especially those in cold climates, may incorporate heating elements or systems to warm the battery pack during charging sessions. This helps mitigate the negative effects of cold temperatures on battery performance and charging speed.

Smart Thermal Management: Some electric vehicles employ smart thermal management strategies that take into account factors such as ambient temperature, battery state of charge, and anticipated driving conditions. These systems adjust heating levels accordingly to optimize efficiency and battery life.

Overall, the heating methods for electric vehicle batteries aim to ensure that the batteries operate within their optimal temperature range, maximizing performance, range, and lifespan, regardless of external conditions.

Current Electric Vehicles Types of Battery Heaters
 a. Resistive Heaters: These use electrical resistance to generate heat. They are straightforward and widely used in many EV models.
 b. Fluid-Based Heaters: These circulate a heated fluid around the battery pack to ensure even temperature distribution.
 c. PTC Heaters: Positive Temperature Coefficient (PTC) heaters are self-regulating and only heat up when necessary, making them energy efficient.

Preheating electric vehicle (EV) batteries can enhance performance and range, especially in cold weather. However, several limitations and challenges are associated with this practice. There is an increase in Energy Consumption as Preheating requires energy, which can drain the vehicle's battery. This reduces the overall range available for driving. There is also Infrastructure Dependency. Effective preheating often depends on access to charging infrastructure. Without a home charger or a reliable public charging network, preheating might not be feasible. There is also the time required to preheat the battery. Preheating can take a significant amount of time, particularly in extremely cold conditions. This requires users to plan ahead, which may not always be convenient. There is System Wear and Tear. Frequent preheating can put additional stress on the battery and heating systems, potentially leading to faster wear and higher maintenance costs over time. There is Limited Efficiency in Extreme Cold. In very low temperatures, preheating may not be sufficient to bring the battery to its optimal operating temperature, limiting its effectiveness. Cold temperatures have an impact on charging speed. Cold batteries charge more slowly, so even if preheating is used, the initial charging rate might be lower until the battery reaches a more optimal temperature. Addressing these limitations involves balancing the benefits of preheating with its drawbacks and considering the specific needs and conditions of EV users.

The Zeolite family of minerals have numerous unique qualities. One of these qualities is that is a highly absorbent material and is commonly used as a desiccant. In the construction of electric batteries moisture and humidity is a problem if excessive. A desiccant is used to absorb the excess moisture. In several examples of the prior art Zeolite is used as a desiccant in batteries and in other devices. For example, U.S. patents number US 2013-0192281A1, US 2015-0345839A1, US 2021-0098842A1, U.S. Pat. No. 10,112,502B2, US 2010-0101613A1. These patents utilize zeolite in the limited capacity of a desiccant and do not mention any of its other properties, nor do they contain the infrastructure or specific process necessary to utilize zeolites heat storage properties.

Here is a description detailing the differences between the prior art vs the proposed invention.

- SG 10201806044 YA—This patent uses Zeolite as heat exchanger medium and not as a source of heat. This prior art transfers heat by the zeolite but does not generate and store heat, a different use of the material. This patent application was abandoned Apr. 25, 2023.
- US 2013-0192281 A1—This patent uses Zeolite as an absorbent and not as a source of heat. In the construction of electric vehicle batteries, moisture and humidity is a problem if excessive. A desiccant is used to adsorb the excessive moisture. In this prior art the zeolite is only used as a desiccant with no use or mention of it being used as a heat source.
- US 2015-0345839 A1—This patent uses Zeolite as an absorbent and not as a source of heat. In the construction of electric vehicle batteries, moisture and humidity is a problem if excessive. A desiccant is used to adsorb the excessive moisture. In this prior art the zeolite is only used as a desiccant with no use or mention of it being used as a heat source.
- US 2021-0098842 A1—This patent uses a desiccant and dryer to extract moisture from the battery pack but does not mention zeolite at all so there is no relevance to this proposed invention.
- U.S. Pat. No. 10,112,502 B2—This patent uses a resistance heater in the battery to heat the battery, nothing about an external heat source developed by zeolite or any other external heat source. Zeolite is used as a desiccant and not as a heat source. Desiccants like salts, etc. are commonly used inside batteries to absorb excess moisture. Zeolite being an absorbent will function as a desiccant as described in this patent. It is further clear that the use of zeolite in this patent is as a desiccant because there is no infrastructure or description of the process that is necessary for zeolite to function in a heat storage capacity.
- US 2010-0101613A1—This patent is for a dishwasher drying unit that includes an absorption column with a reversibly dehydratable drying agent, and having an air circulation loop through the washing compartment and the drying unit. This has nothing to do with a battery of any kind. This is an absorption device.

The use of Zeolite in this application is using the zeolite to generate heat to warm the battery, not transferring away the temperature in the battery. In addition, the zeolite needs to be pre-charged with a heater so that the zeolite is able to release its stored heat later when requested. It also requires the addition of water and specific infrastructure to use zeolite as a heat source. Nothing stating this charging and heat generation is mentioned in the prior art.

The effort mentioned in the Fraunhofer work (Fraunhofer Institute for Interfacial Engineering and Biotechnology IGB, "Compact and Flexible Thermal Storage", Fraunhofer Research News (June 2012) at https://www.fraunhofer.de/en/press/research-news/2012/june/compact-and-flexible-thermal-storage.html) was experiments in creating Zeolite pellets which could be used in future applications. There has been nothing noted that they created a production process to manufacture the pellets or nothing mentioned about any products created using the pellets.

BRIEF SUMMARY OF THE INVENTION

This invention is a standalone portable device that can be attached to a battery cell or battery pack to assist starting the battery in cold temperatures and to keep it in running optimally. It works by utilizing a natural property of the mineral family of zeolites to store heat that can be later passively released by adding water to the pre-charged zeolite. The zeolite is stored in a container that has provisions to add water and once the water is added the zeolite releases its stored heat. The heat is transferred to the containers heat coil, that then transfers that heat to the battery. By warming up the battery it enables electrons to freely move within the battery and for the battery to function. To recharge the heat to the depleted zeolite the heat coil is used in reverse to heat zeolite and evaporate the water which leaves the container via a one-way steam valve. The zeolite is then recharged with heat and ready for another use.

This system will allow a battery operated system that is pre charged to begin operations in a cold temperature without a grid connection or additional fuel source. The zeolite heater just needs to have easily available water added to it and you can start a battery in cold temperature and get it to run optimally once started.

BRIEF DESCRIPTION OF THE DRAWINGS

FIG. 1 is a diagrammatic view of one embodiment of a zeolite battery heater.

DETAILED DESCRIPTION OF THE INVENTION

Water application port (1), opens to the outside of the container (7) and then extends in the container (7) with a pipe that allows water to distribute evenly onto the zeolite media (3) contained within. On top of the container (7) is a one-way steam valve (2). Within the container (7) and extending out from it is a heat coil (4). Heat coil (4) extends to a battery pack (5).

The zeolite media (3) in a container (7) where water is added (1) then heating a heat coil (4) that transfers heat to the battery (5). When the water is heated out of the zeolite media (3) the steam escapes through the steam valve (2).

The insulated container (7) holds zeolite media (3) this zeolite is charged up to store heat by wetting it and then using the heat coil (4) to heat it and evaporate the water out of the zeolite. The steam will leave the container (7) through the steam valve (2) on the top of the container. To use the stored heat you then add water at port (1) to wet the zeolite. The zeolite will begin to release its stored heat when it gets wet. This heat will then heat up the heat coil (4). The heat coil (4) will then transfer the heat to the battery pack (5). Once the heat is exhausted from the zeolite it can be recharged by the same process of heating the zeolite with the heat coil and evaporating the water again.

The zeolite will need to be recharged after every use, this is done by heating it until the water evaporates and the zeolite (3) dries storing the heat in the process. For this reason, a one-way steam release valve (2) is added to the zeolite container (7). The heating element within the zeolite container (7) can be used to reheat the zeolite once it has exhausted its stored heat.

The invention works by addressing battery functionality in cold temperatures in two ways. Number one is to utilize the natural property of the mineral family of zeolite to store heat and make that stored heat portable. Zeolite will release its heat when water is added to it. This makes it an ideal portable heating substrate to precondition a cold battery. The zeolite is stored in an insulated container that has an inlet to add water so that you can release the heat stored in the zeolite. The heat is then transferred to a heating element which carries it to the battery pack. When the heat is transferred to the battery to precondition it for use it starts to excite the electrons and increase the flow of stored electricity from the battery. The second way this invention addresses battery functionality in cold temperatures is to help maintain an optimal battery temperature when the battery is running. Lithium-ion batteries decrease functionality in cold temperatures. That functionality decreases until at a certain temperature the battery ceases all operations. EV range drops 20% for each 10° C. drop in temperature.

Electric vehicles and eVTOL's (electric Vertical Take-Off and Landing aircraft) have limited environments where they can be used due to the temperature limitations for battery functionality. This invention will offer a portable rechargeable and clean energy friendly solution to increase the environments in which electric vehicles and other devices can be used.

Along with the advantages this invention will give to electric vehicles it will also expand the usability of other battery powered systems to function in climatic conditions where they currently are limited. Such as battery power for off planet colonization and various satellite systems. Many cold remote locations are difficult to bring a steady fuel supply to and renewable energy systems such as solar power rely on being able to store that energy in batteries. This invention will ensure that the battery stored energy is accessible when it is needed. The steam that escapes the container during the recharging of the zeolite can be contained in another container as water to be used when you need to discharge the zeolite again so water is not wasted in an environment where access to water is limited.

In addition to the significant impact this invention will have on the functionality of electric vehicles and other battery operated systems; the specific process and infrastructure of the invention can be used to provide a clean and renewable heat source to homes, buildings, vehicle interiors and defrosting, and cooking amongst other uses.

The invention claimed is:

1. A battery heater, comprising: a container having an inlet and a one-way steam release valve; zeolite media disposed within the container; and, a heat coil having a first end disposed within the container and a second end disposed outside of the container and configured for connection to a battery pack; wherein water entering the container through the inlet is configured to be absorbed by the zeolite causing release of heat stored in the zeolite which is transferred by the heat coil out of the container to the battery pack; and wherein heat subsequently entering the container through the heat coil is configured to be absorbed by the zeolite causing evaporation of water stored in the zeolite which is transferred out of the container through the one-way steam release valve.

* * * * *